United States Patent
Hidaka et al.

(10) Patent No.: US 12,078,478 B2
(45) Date of Patent: Sep. 3, 2024

(54) MEASUREMENT APPARATUS, CONTROL APPARATUS, AND CONTROL METHOD

(71) Applicant: MITUTOYO CORPORATION, Kanagawa (JP)

(72) Inventors: Kazuhiko Hidaka, Tokyo (JP); Tomohiro Kiire, Tokyo (JP); Hideki Mishima, Miyazaki (JP); Tomoyuki Miyazaki, Kanagawa (JP); Naoki Mitsutani, Kanagawa (JP); Yoshinori Shirakawa, Kanagawa (JP); Tsutomu Ichimura, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 338 days.

(21) Appl. No.: 17/517,903

(22) Filed: Nov. 3, 2021

(65) Prior Publication Data
US 2022/0155065 A1    May 19, 2022

(30) Foreign Application Priority Data
Nov. 19, 2020    (JP) ................................ 2020-192242

(51) Int. Cl.
*G01B 21/16* (2006.01)
*G06T 7/579* (2017.01)

(52) U.S. Cl.
CPC .............. *G01B 21/16* (2013.01); *G06T 7/579* (2017.01); *G06T 2200/08* (2013.01)

(58) Field of Classification Search
CPC ...... G01B 21/16; G01B 11/005; G01B 11/24; G06T 7/579; G06T 2200/08; G06T 7/60;
(Continued)

(56) References Cited

U.S. PATENT DOCUMENTS

| 5,570,458 A | * | 10/1996 | Umeno | G05B 19/425 700/251 |
| 2005/0166413 A1 | * | 8/2005 | Crampton | G01B 5/008 33/503 |

(Continued)

FOREIGN PATENT DOCUMENTS

| JP | 2006-329903 A | 12/2006 |
| JP | 2017-9383 | 1/2017 |
| JP | 2019-109071 | 7/2019 |

*Primary Examiner* — Jonathan M Hansen
(74) *Attorney, Agent, or Firm* — Greenblum & Bernstein, P.L.C.

(57) ABSTRACT

A measurement apparatus includes a sensor that measures a workpiece, a multi-axis robot that moves the sensor in a three-dimensional space, a position determination part that determines i) a plurality of measurement positions that are positions along a normal direction at each of a plurality of positions to be measured on the workpiece and ii) a direction of the sensor at each of the plurality of measurement positions on the basis of at least either design data or captured image data indicating the geometry of the workpiece, a moving control part that sequentially moves the sensor to the plurality of measurement positions by controlling the robot, and a measurement control part that outputs measured data indicating a result that the sensor measured at each of the plurality of measurement positions in association with the plurality of positions to be measured.

15 Claims, 8 Drawing Sheets

(58) Field of Classification Search
CPC ............ G06T 7/75; G06T 2207/10012; G05B 2219/40613; G05B 2219/40616
See application file for complete search history.

(56) References Cited

U.S. PATENT DOCUMENTS

| | | |
|---|---|---|
| 2006/0269123 A1 | 11/2006 | Horita et al. |
| 2013/0011018 A1* | 1/2013 | Tateno ................. G01B 11/002 |
| | | 901/14 |
| 2019/0072382 A1* | 3/2019 | Hirano ................. G01B 11/303 |
| 2019/0188841 A1 | 6/2019 | Kato |
| 2020/0286258 A1* | 9/2020 | Hoerr ................... G01B 11/005 |
| 2022/0371201 A1* | 11/2022 | Moriyama .......... G05B 19/4183 |

* cited by examiner

MEASUREMENT APPARATUS, CONTROL APPARATUS, AND CONTROL METHOD

CROSS-REFERENCE TO RELATED APPLICATIONS

The present application claims priority to Japanese Patent Applications number 2020-192242, filed on Nov. 19, 2020. The contents of this application are incorporated herein by reference in their entirety.

BACKGROUND OF THE DISCLOSURE

The present disclosure relates to a measurement apparatus, a control apparatus, and a control method for measuring a workpiece.

As disclosed in Japanese Unexamined Patent Application Publication No. 2006-329903, conventionally, a three-dimensional measurement method for measuring the geometry of a workpiece has been known.

In the conventional measurement method, it is necessary to teach the route to move a probe for measuring the geometry of a workpiece. When teaching is performed every time the direction of the workpiece or the type of workpiece is changed, the ratio of the time required for teaching within the measurement time increases and so the measurement efficiency decreases. Thus, a method to reduce teaching time has been required.

BRIEF SUMMARY OF THE DISCLOSURE

The present disclosure has been made in view of these points, and an object of the present disclosure is to provide a measurement apparatus, a control apparatus, a control method, and a program that can eliminate the need for teaching or reduce teaching time when measuring a workpiece.

A measurement apparatus in the first embodiment of the present disclosure includes a sensor that measures a workpiece, a multi-axis robot that moves the sensor in a three-dimensional space, a position determination part that determines a plurality of measurement positions that are positions along a normal direction at each of a plurality of positions to be measured of the workpiece and a direction of the sensor at each of the plurality of measurement positions on the basis of at least either design data or captured image data indicating the geometry of the workpiece, a moving control part that sequentially moves the sensor to the plurality of measurement positions by controlling the robot, and a measurement control part that outputs measured data indicating a result that is measured by the sensor at each of the plurality of measurement positions in association with the plurality of positions to be measured.

A control device in the second embodiment of the present disclosure includes a position determination part that determines a plurality of measurement positions that are positions along a normal direction at each of a plurality of positions to be measured of a workpiece, and a direction of a sensor that measures the workpiece at the plurality of measurement positions, on the basis of at least either design data or captured image data indicating the geometry of the workpiece, a moving control part that sequentially moves the sensor to the plurality of measurement positions by controlling a robot that moves the sensor in a three-dimensional space, and a measurement control part that outputs measured data indicating a result that the sensor measured at each of the plurality of measurement positions in association with the plurality of positions to be measured.

A control method in the third embodiment of the present disclosure, performed by a computer, includes the steps of determining a plurality of measurement positions that are positions along a normal direction at each of a plurality of positions to be measured on a workpiece, and a direction of a sensor that measures the workpiece at the plurality of measurement positions, on the basis of at least either design data or captured image data indicating the geometry of the workpiece, sequentially moving the sensor to the plurality of measurement positions by controlling a robot that moves the sensor in a three-dimensional space, and outputting measured data indicating a result that the sensor measured at each of the plurality of measurement positions in association with the plurality of positions to be measured.

DETAILED DESCRIPTION OF THE DISCLOSURE

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Outline of Measurement Apparatus S

Figure 1:
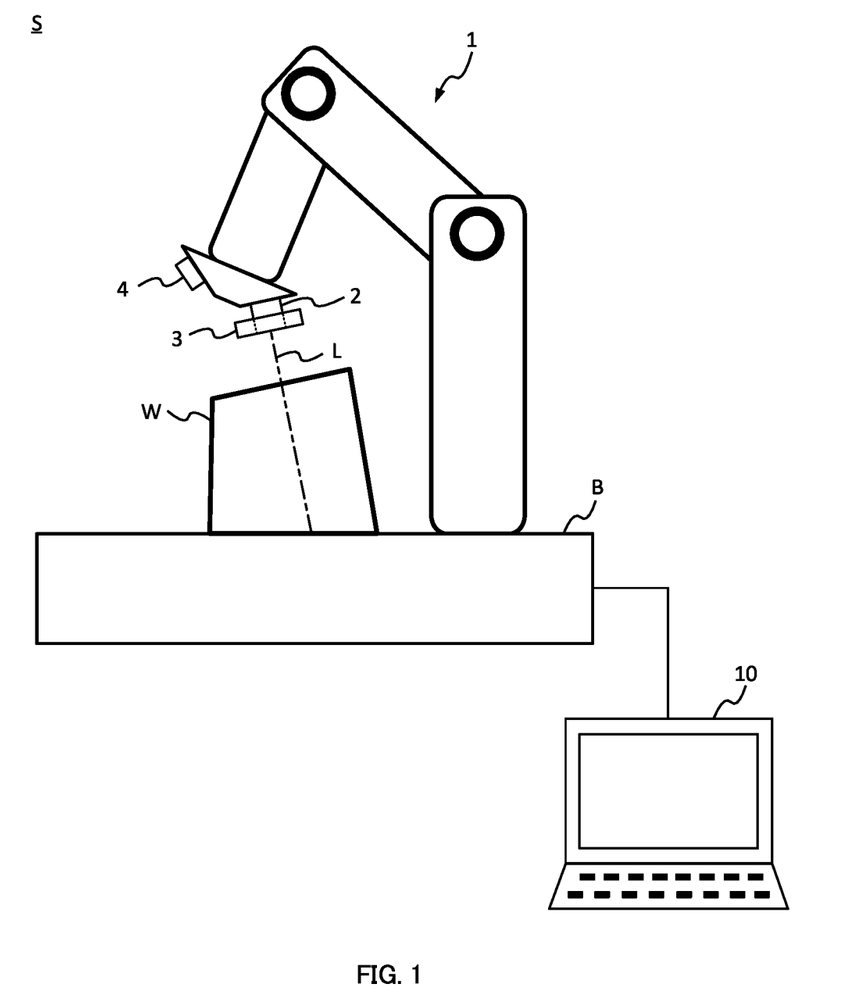
FIG. 1 shows an outline of a measurement apparatus.

FIG. 1 shows an outline of a measurement apparatus S. The measurement apparatus S is an apparatus for measuring a workpiece W. Measurement of the workpiece W includes any type of measurement of properties of the workpiece W, such as measuring coordinates of a plurality of positions on the workpiece W, measuring the distance between a plurality of positions on the workpiece W, or measuring the color of the workpiece W.

The Measurement apparatus S includes a robot 1, a sensor 2, a light 3, a camera 4, and a control apparatus 10. The measurement apparatus S measures the workpiece W by moving the sensor 2 to any position in a three-dimensional space using the robot 1. The robot 1 is a multi-axis (e.g., 6-axis) robot that moves the sensor 2 in the three-dimensional space, and is fixed to a mounting table B where the workpiece W is to be placed, for example. The position where the robot 1 is fixed is arbitrary, and the robot 1 may be fixed to a position other than the mounting table B as long as the relation between the position of the workpiece W and a fixed position of the robot 1 during measurement is constant. The robot 1 may have any configuration and geometry, as long as it has a moving mechanism or a driving mechanism for moving the sensor 2 in the three-dimensional space and has a function for transmitting and receiving data to and from the control apparatus 10.

The robot 1 shown in FIG. 1 is provided with the sensor 2, the light 3, and the camera 4. By moving an arm on the basis of control information inputted from the control apparatus 10, the robot 1 can move the positions of the sensor 2, the light 3, and the camera 4 that are mounted on the arm to be any positions. The robot 1 may be provided with a plurality of types of sensors 2, and the sensors 2 may be configured to be detachable so that the plurality of types of sensors 2 can be interchanged.

The sensor 2 is a device used to measure the properties of the workpiece W and to acquire measured data indicating the properties of the workpiece W. The sensor 2 acquires a plurality of pieces of measured data by performing a measurement operation at a plurality of measurement positions in a direction of a normal L of the surface of the workpiece W at a plurality of positions to be measured on the workpiece W. The sensor 2 is an imaging element, an interferometer sensor, a laser scanner, a laser range finder, or a confocal chromatic sensor, for example. The position to be measured is determined by the control apparatus 10, for example.

The light 3 is an illumination device that emits light toward the workpiece W such that the surface of the workpiece W is subjected to appropriate brightness when the sensor 2 measures the workpiece W. The light 3 is used when a measured result is affected by the brightness of the surface of the workpiece W as in a case where the sensor 2 is an imaging element, for example.

Figure 2:
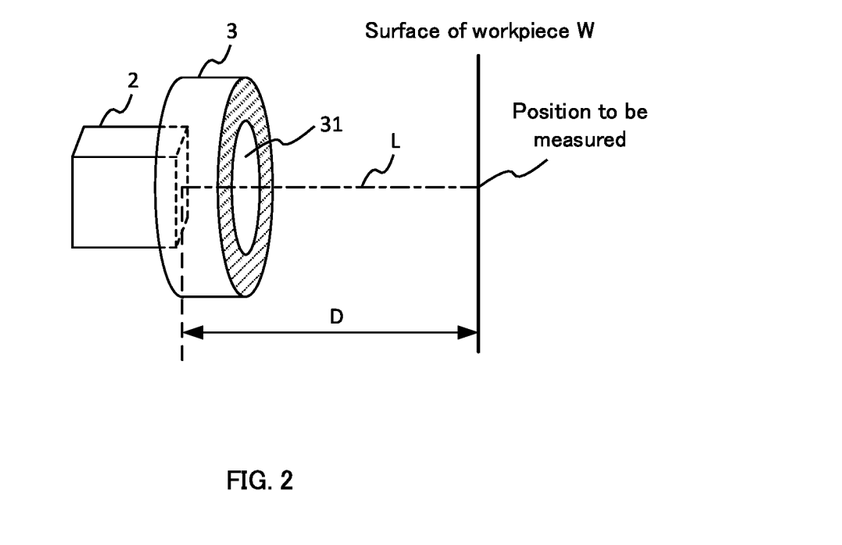
FIG. 2 is a schematic diagram showing a configuration example of a sensor and an illumination device when the sensor is an imaging element.

FIG. 2 is a schematic figure of a configuration example of the sensor 2 and the light 3 when the sensor 2 is an imaging element. The light 3 is coupled to the sensor 2, and has an aperture 31 for passing light radiated from the sensor 2 and light reflected from the workpiece W. If the sensor 2 emits light, the light 3 may radiate light in a direction where the sensor 2 emits light for measurement. The light 3 has an annular shape, for example, and emits light toward the surface of the workpiece W from a region indicated by hatched lines.

The sensor 2 images the surface of the workpiece W at a position where an imaging direction (e.g., the direction of an optical axis) overlaps the normal L at a position to be measured on the workpiece W. Further, the sensor 2 also images the surface of the workpiece W at a position where the distance D from the surface of the workpiece W corresponds to the focal distance of the sensor 2.

The camera 4 is an imaging device, such as a still picture camera or a video camera, which is used for identifying the outline geometry of the workpiece W to determine a measurement position and a measurement direction of the sensor 2. The camera 4 generates a plurality of pieces of captured image data by imaging the workpiece W at a plurality of imaging positions before starting measurement using the sensor 2, for example. The camera 4 transmits the generated captured image data to the control apparatus 10.

Figure 3:
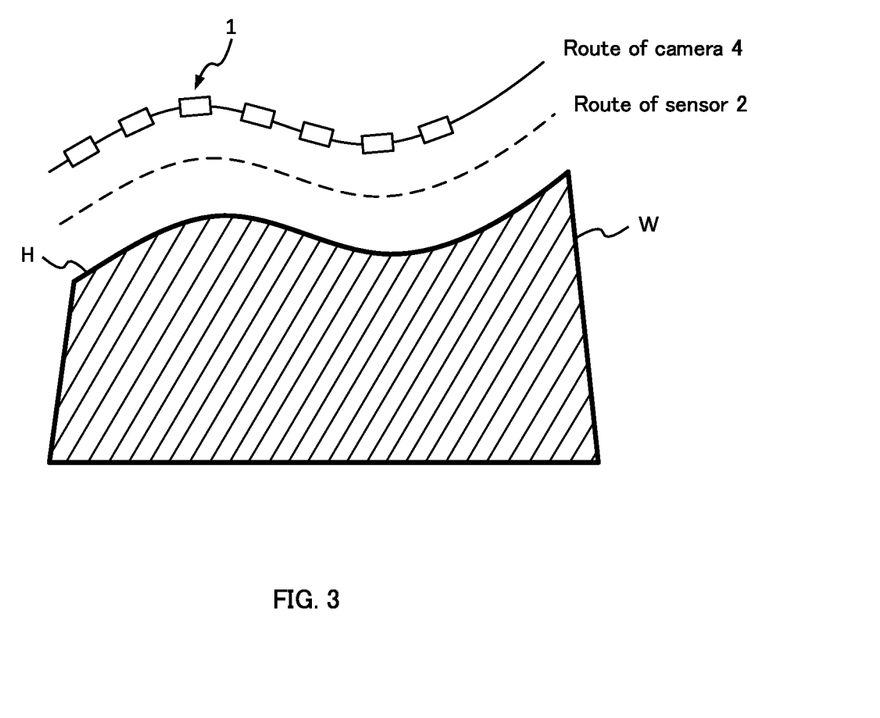
FIG. 3 is for explaining an outline of the operation of an imaging device.

FIG. 3 is for explaining an outline of an operation of the camera 4. FIG. 3 shows a cross section of the workpiece W, a route of the camera 4, and a route of the sensor 2. The camera 4, indicated by a rectangle in FIG. 3, sequentially generates a plurality of pieces of captured image data by photographing the surface H of the workpiece W while moving on a route that keeps approximately constant distance from the surface H of the workpiece W. The camera 4 moves along a plurality of routes while maintaining a constant distance from the surface H of the workpiece W, and generates a plurality of pieces of captured image data indicating the state of the surface H of all the regions of the workpiece W that are not in contact with the mounting table B. The plurality of pieces of captured image data thus generated are used to determine a route for the sensor 2 to perform measurement.

The control apparatus 10, by controlling the robot 1, the sensor 2, the light 3, and the camera 4, performs measurement for a plurality of positions to be measured on the workpiece W at a plurality of measurement positions, and identifies the geometry of the workpiece W on the basis of an acquired plurality of pieces of measured data. The control apparatus 10 will be described in detail later and will be outlined below.

The sensor 2 generates measured data by measuring the workpiece W at a plurality of measurement positions. The control apparatus 10 detects the position of an edge where the state of the workpiece W (e.g., the direction, the material, the color of the surface) changes, on the basis of the measured data generated by the sensor 2 to identify the geometry of the workpiece W on the basis of the detected position of the edge. The control apparatus 10, when detecting the edge of a circular region, for example, measures the geometry of the workpiece W by calculating the inner diameter, the outer diameter, or the like of the circular region. The edge corresponds to a boundary position where the state of the workpiece W changes. When the sensor 2 is an imaging element, the edge is identified by a line segment connecting a plurality of positions where the amount of change in luminance between a plurality of neighboring pixels is equal to or greater than a threshold in the captured image data generated by the sensor 2, for example.

When the sensor 2 is a laser scanner, the sensor 2 projects a line-shaped laser beam in the direction of the normal L towards the workpiece W, and generates measured image data acquired by photographing reflected light of the projected laser beam on the surface of the workpiece W. The control apparatus 10 identifies the cross-sectional geometry of the workpiece W on the basis of measured image data.

When the sensor 2 is a laser range finder or a confocal chromatic sensor, the sensor 2 measures the distance between the sensor 2 and the surface of the workpiece W at a plurality of measurement positions, and generates distance data indicating the measured distance. The control apparatus 10 identifies the uneven geometry of the workpiece W on the basis of a plurality of pieces of distance data corresponding to the plurality of measurement positions.

When the sensor 2 is an interferometer sensor, the control apparatus 10 identifies the uneven geometry in the periphery of a position to be measured on the basis of the measured data. The control apparatus 10 identifies the uneven geometry of the surface of the workpiece W by synthesizing the uneven geometry corresponding to a plurality of positions to be measured.

Figure 4:
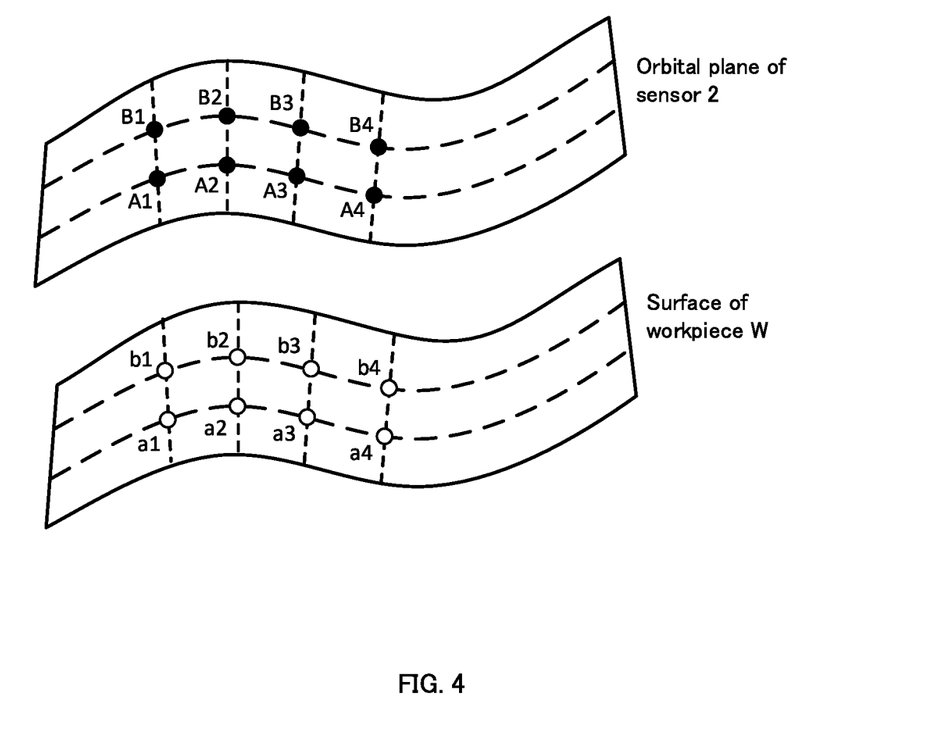
FIG. 4 shows the relation between a position to be measured and a measurement position.

FIG. 4 shows the relation between a position to be measured and a measurement position. To perform measurement for a plurality of positions to be measured a1, a2, a3, a4 on the surface of the workpiece W, the control apparatus 10 sequentially moves the sensor 2 to measurement positions A1, A2, A3, A4, which are positions that are separated by a predetermined distance (e.g., the focal distance of the sensor 2) from each position to be measured, in the normal direction of each position to be measured. Similarly, the control apparatus 10 sequentially moves the sensor 2 to measurement positions B1, B2, B3, B4 to perform measurement for a plurality of positions to be measured b1, b2, b3, b4 on the surface of the workpiece W. The control apparatus 10 outputs measured data in which data (e.g., coordinate data) for identifying those plurality of measurement positions and measured values at each measurement position are associated with each other.

Configuration of Control Apparatus 10

Figure 5:
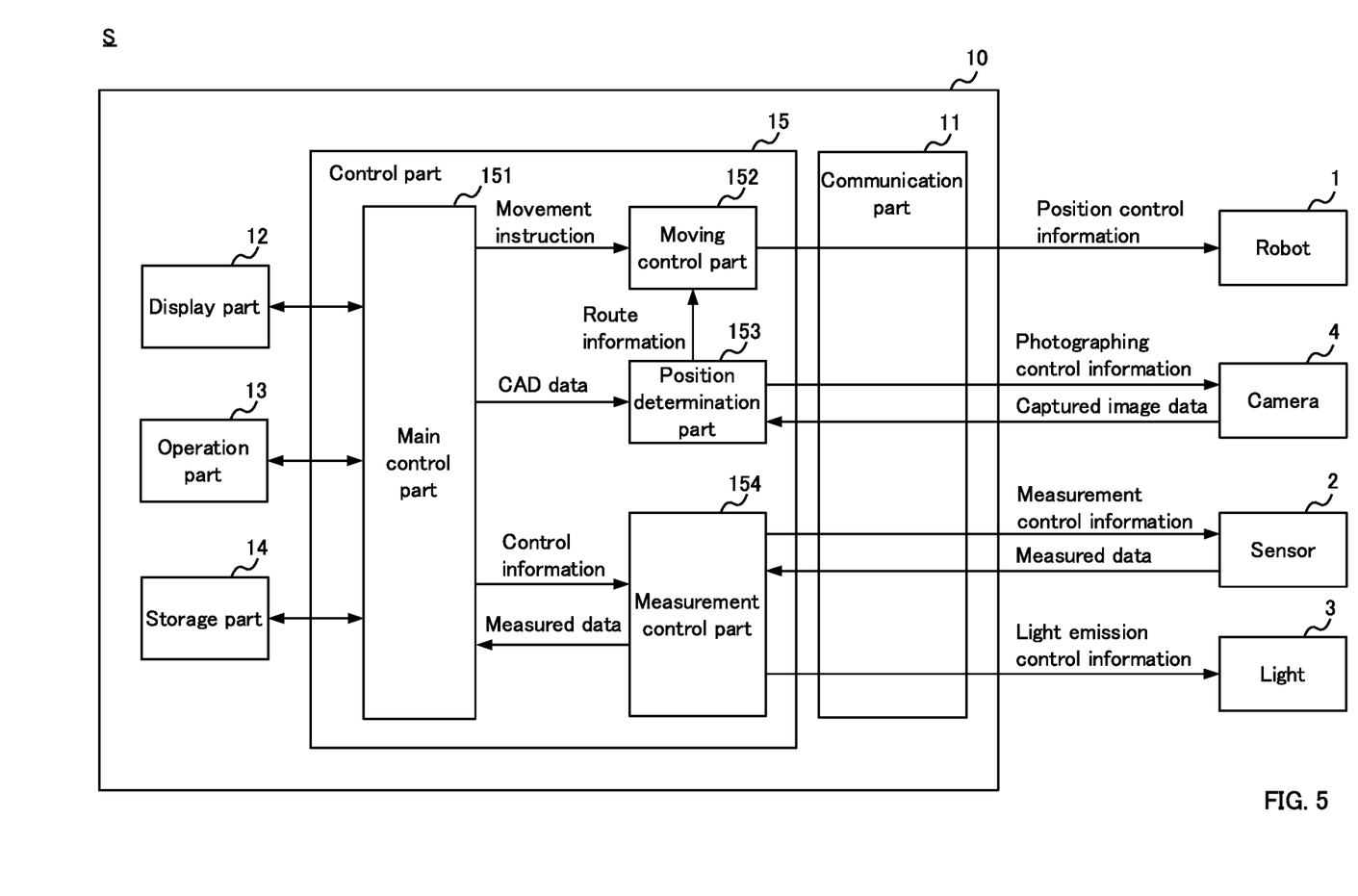
FIG. 5 shows a configuration of a control apparatus.

FIG. 5 shows a configuration of the control apparatus 10. The control apparatus 10 includes a communication part 11, a display part 12, an operation part 13, a storage part 14, and a control part 15. The control part 15 includes a main control part 151, a moving control part 152, a position determination part 153, and a measurement control part 154.

The communication part 11 has a communication interface for transmitting and receiving various types of data to and from the robot 1, the sensor 2, the light 3, and the camera 4. The communication interface is Ethernet, Local Area Network (WLAN), General Purpose Interface Bus (GPIB), or Universal Serial Bus (USB), for example. The communication part 11 may have a plurality of different communication interfaces corresponding respectively to the robot 1, the sensor 2, the light 3, and the camera 4, or may transmit and receive data to and from the robot 1, the sensor 2, the light 3, and the camera 4 using a single communication interface.

The communication part 11 may transmit and receive data between an external device other than the robot 1, the sensor 2, the light 3, and the camera 4. The communication part 11 transmits a message requesting design data to a computer that stores the design data of the workpiece W, for example, and receives the design data from the computer. The communication part 11 stores the received design data in the storage part 14 via the main control part 151, for example. In the following explanation, a case where the design data is Computer Aided Design (CAD) data will be exemplified, but the design data may be data other than CAD data.

The communication part 11 transmits position information for controlling the position of the robot 1 to the robot 1 on the basis of an instruction from the moving control part 152, for example. Further, the communication part 11 transmits photographing control information for causing the sensor 2 to take a picture on the basis of an instruction from the position determination part 153, and receives captured image data generated by the sensor 2. The sensor 2 inputs the received captured image data to the position determination part 153.

Further, the communication part 11 transmits measurement control information for causing the sensor 2 to perform measurement to the sensor 2, on the basis of an instruction from the measurement control part 154, and receives measured data generated by the sensor 2. The measurement control information includes data instructing the performance of a measurement. The measurement control information may include information (e.g., coordinate data) for identifying a measurement position or a position to be measured. The communication part 11 inputs the received measured data to the measurement control part 154. Further, the communication part 11 transmits light emission control information for controlling the emission amount of the light 3 to the light 3 on the basis of an instruction from the measurement control part 154.

The display part 12 has a display for displaying various pieces of information. The display part 12 displays a screen for a measurer who uses the control apparatus 10 to perform various operations, and displays a measured result.

The operation part 13 is a device for the measurer to perform an operation, such as a keyboard, a mouse, or a touch panel.

The storage part 14 includes a storage medium such as a Read Only Memory (ROM), a Random Access Memory (RAM), and a Solid State Drive (SSD). The storage part 14 stores a program to be executed by the control part 15. Further, the storage part 14 stores various types of data required for operations of the robot 1, the sensor 2, the light 3, and the camera 4. The storage part 14 stores CAD data acquired from an external computer, captured image data received from the camera 4, and measured data received from the sensor 2, for example.

The control part 15 includes a Central Processing Unit (CPU), for example. The control part 15 functions as the main control part 151, the moving control part 152, the position determination part 153, and the measurement control part 154 by executing a program stored in the storage part 14.

The main control part 151 transmits and receives data to and from the display part 12, the operation part 13, and the storage part 14. The main control part 151 starts measuring the workpiece W in response to an operation by the measurer, and controls the moving control part 152, the position determination part 153, and the measurement control part 154. The main control part 151 inputs a movement instruction for moving the robot 1 to an imaging position or a measurement position, to the moving control part 152, for example. Further, the main control part 151 reads CAD data stored in the storage part 14, and inputs the CAD data to the position determination part 153, causing the position determination part 153 to determine an imaging position and a measurement position. In addition, the main control part 151 inputs control information for performing measurement to the measurement control part 154, and stores measured data acquired from the measurement control part 154 in the storage part 14.

The moving control part 152 moves the sensor 2, the light 3, and the camera 4 mounted on the robot 1 by controlling the robot 1. The moving control part 152 sequentially moves the camera 4 to a plurality of imaging positions by controlling the robot 1, for example. Further, the moving control part 152 sequentially moves the sensor 2 to a plurality of measurement positions corresponding to a plurality of positions to be measured, by controlling the robot 1.

To move the sensor 2 to a measurement position and move the camera 4 to an imaging position, the moving control part 152 transmits, to the robot 1, position control information including i) a measurement position with a predetermined position as the origin or ii) coordinate data of an imaging position, as an instruction value. The moving control part 152 may transmit the position control information including one piece of coordinate data at the timing of moving the robot 1, or may transmit the position control information in which a plurality of timings and a plurality of pieces of coordinate data are associated with each other.

The moving control part 152 may generate the position control information by reading a plurality of pieces of coordinate data stored in the storage part 14 beforehand, or may generate the position control information including a plurality of pieces of coordinate data inputted by the measurer via the operating part 13. In the present embodiment, the moving control part 152 generates the position control information including a plurality of pieces of coordinate data indicated by the route information notified from the position determination part 153.

When moving the camera 4, the moving control part 152 uses the position control information including a plurality of pieces of coordinate data stored in the storage part 14 beforehand or a plurality of pieces of coordinate data inputted by the measurer. When moving the sensor 2, the moving control part 152 may generate the position control information on the basis of the route information notified from the position determination part 153 to control the position of the sensor 2 with higher accuracy. In this case, the moving control part 152 sequentially moves the sensor 2 to a plurality of measurement positions for measuring the workpiece W at a plurality of positions to be measured (i.e., the position to be measured for which the normal direction has been identified by the position determination part 153 to be described later) indicated by the route information notified from the position determination part 153.

Incidentally, when moving the arm of the robot 1, it is assumed that the appropriate instruction value varies depending on the direction from which the arm approaches a measurement position, due to the influence of inertia of the arm. Therefore, the moving control part 152 may move the sensor 2 to a plurality of measurement positions by notifying the robot 1 of the position control information including an instruction value that is determined on the basis of a direction in which the sensor 2 is moved sequentially to a plurality of measurement positions.

The position determination part 153 determines a plurality of imaging positions, a plurality of positions to be measured, and a plurality of measurement positions on the basis of at least either the CAD data indicating the geometry of the workpiece W or the captured image data generated by the camera 4. The position determination part 153 may further determine the direction of the sensor 2 at each of the plurality of measurement positions.

The position determination part 153 identifies the orientation with which the workpiece W is placed on the mounting table B on the basis of the captured image data generated by photographing the whole of the workpiece W with the camera 4 at a predetermined position, for example, and determines a photographing route of the camera 4 on the basis of the identified result. The position determination part 153 determines a plurality of positions each separated from the surface of the workpiece W by a distance corresponding to the focal distance of the camera 4 as a plurality of imaging positions, and determines a route including the determined plurality of imaging positions as the imaging route, for example. The position determination part 153 notifies the moving control part 152 of the route information indicating the photographing route. The position determination part 153 notifies the moving control part 152 of the determined plurality of imaging positions as the route information, for example.

The position determination part 153 may determine a plurality of positions to be measured and a plurality of measurement positions by generating distance image data on the basis of a plurality of pieces of captured image data, which is acquired by photographing the workpiece W by the camera 4 at a plurality of different positions, and by identifying the three-dimensional geometry of the workpiece W on the basis of the generated distance image data. Further, the camera 4 is a stereo camera capable of generating distance image data as captured image data, and the position determination part 153 may determine a plurality of positions to be measured and a plurality of measurement positions by identifying the three-dimensional geometry of the workpiece W on the basis of the distance image data generated by the camera 4.

The position determination part 153 may determine space between a plurality of imaging positions on the basis of a range measurable by the sensor 2. The position determination part 153 determines a position separated from a first imaging position by a predetermined length in the moving direction of the sensor 2, as a second imaging position on the basis of the range measurable by the sensor 2, for example. In a case where the range measurable by the sensor 2 is a square, the length determined on the basis of the range measurable by the sensor 2 is the length of one side of the square or less than the length of one side of the square, for example. By operating in this manner, the position determination part 153 enables the camera 4 to generate a plurality of pieces of captured image data corresponding to the entire region where the sensor 2 performs measurement.

The position determination part 153 determines a plurality of positions to be measured on the basis of at least either the CAD data or the captured image data generated by the camera 4. The position determination part 153 determines, as a plurality of positions to be measured, a plurality of positions on the edge of the workpiece W, which is identified on the basis of at least either the CAD data or the captured image data, and determines a plurality of positions with a certain amount of space therebetween in the region surrounded by the edges as a plurality of positions to be measured, for example. The position determination part 153 may determine a plurality of positions to be measured further on the basis of the type of measurement set by the measurer.

Further, the position determination part 153 determines a plurality of measurement positions corresponding to a plurality of positions to be measured. The position determination part 153 determines a measurement position along the normal direction by identifying the normal direction at the position to be measured on the basis of the captured image data corresponding to a position to be measured. The position determination part 153 determines a plurality of measurement positions, which are positions along the normal direction at each of a plurality of positions to be measured on the workpiece W, on the basis of at least either the CAD data indicating the geometry of the workpiece W or the captured image data generated by the camera 4.

Also, the position determination part 153 determines the direction of the sensor 2 at each of a plurality of measurement positions. The position determination part 153 determines a direction in which the accuracy obtained when the sensor 2 measures the workpiece W is relatively high, as the direction of the sensor 2, for example. When the sensor 2 is an imaging element, the position determination part 153 determines the direction of the sensor 2 such that the optical axis direction of the sensor 2 matches the normal direction at the position to be measured corresponding to the measurement position. The position determination part 153 notifies the moving control part 152 of the determined measurement position and measurement direction, and thereby causing the moving control part 152 to control the adjustment mechanism of the robot 1 to adjust the measurement position and the measurement direction.

The position determination part 153 identifies the normal direction at the position to be measured corresponding to the first imaging position on the basis of first captured image data generated by the imaging device at the first imaging position of a plurality of imaging positions. Further, the position determination part 153 identifies the normal direction at the position to be measured corresponding to the second imaging position on the basis of the second captured image data generated by the camera 4 at the second imaging position. The position determination part 153 determines the measurement position along the normal direction at each position to be measured.

The position determination part 153 determines a position corresponding to the focal distance of the sensor 2 from the position to be measured as the measurement position along the normal direction at the position to be measured. That is, the position determination part 153 determines a plurality of measurement positions such that the distance between i) the position to be measured identified on the basis of at least either the CAD data or the captured image data, and ii) the measurement position corresponding to the position to be measured is the focal distance of the sensor 2. The position determination part 153 determines a position separated from the first position to be measured by the focal distance of the sensor 2 along the normal direction at the first position to be measured, as the first measurement position. The position determination part 153 determines a position separated from the second position to be measured by the focal distance of the sensor 2 along the normal direction at the second position to be measured, as the second measurement position.

When using both the CAD data and the captured image data, the position determination part 153 identifies a provisional normal direction at each of a plurality of positions to be measured on the basis of the CAD data, and identifies the normal direction by correcting the provisional normal direction on the basis of the state of the workpiece W identified on the basis of the captured image data corresponding to the position to be measured.

Figure 6A:
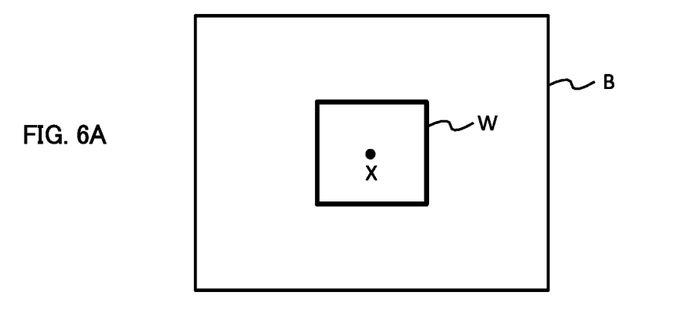
FIGS. 6A to 6D are for explaining an example of the operation of a position determination part to determine a normal direction.
Figure 6B:
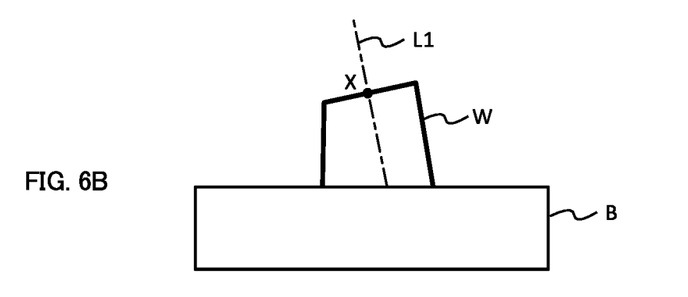
Figure 6C:
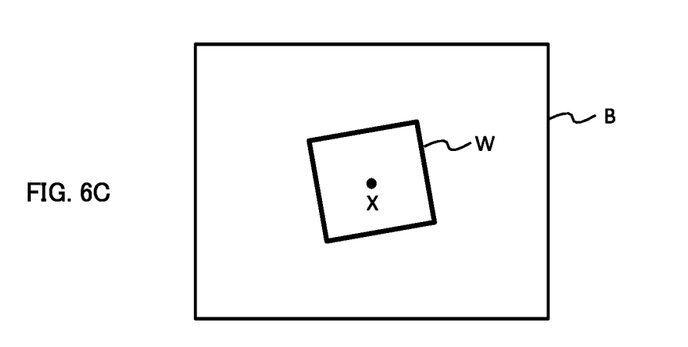
Figure 6D:
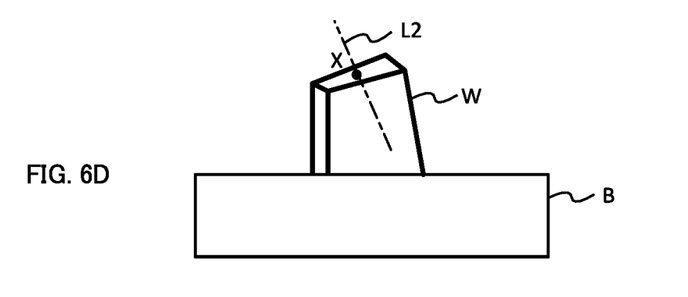

FIGS. 6A to D are for explaining an example of an operation in which the position determination part 153 identifies a normal direction. FIG. 6A shows an upper view of the workpiece W in a state of being placed on the mounting table B with a first orientation, and FIG. 6B shows a side view of the workpiece W in a state of being placed on the mounting table B with the first orientation. FIG. 6C shows an upper view of the workpiece W in a state of being placed on the mounting table B with a second orientation, and FIG. 6D shows a side view of the workpiece W in a state of being placed on the mounting table B with the second orientation. The first direction is the same as the direction of the workpiece W indicated by the CAD data, and the second direction differs from the direction of the workpiece W indicated by the CAD data. Here, it is assumed that the workpiece W was in the state of FIG. 6C and FIG. 6D at the time when the camera 4 photographed the workpiece W.

The position determination part 153 identifies the direction of a provisional normal L1 at a position to be measured X shown in FIG. 6A and FIG. 6B on the basis of the CAD data. The position determination part 153 identifies that the workpiece W is placed with the second orientation as shown in FIG. 6C and FIG. 6D and that there is an angle difference from the orientation of the workpiece W indicated by the CAD data, on the basis of the captured image data. The position determination part 153 identifies the direction of a normal L2 that is different from the direction of the provisional normal L1 on the basis of the identified angle difference. Thus, regardless of an orientation with which the workpiece W is placed on the mounting table B, the position determination part 153 can accurately identify a normal direction at a position to be measured by using the CAD data and the captured image data.

The position determination part 153 may identify a normal direction using only the CAD data. In a case where an orientation with which the workpiece W is mounted on the mounting table B is determined, the position determination part 153 can identify the direction of the provisional normal L1 shown in FIG. 6B as the normal direction at the position to be measured, for example.

The position determination part 153 may identify a normal direction using only the captured image data. The position determination part 153 can identify a normal direction by identifying the angle of the surface of the workpiece W on the basis of a distribution state of luminance values according to a position within the imaging region of the captured image data, for example. By generating a distance image on the basis of a plurality of pieces of captured image data generated by photographing the same region of the surface of the workpiece W with a plurality of different imaging devices, the position determination part 153 may identify a normal direction on the basis of the distance image.

The position determination part 153 may determine a route that includes a plurality of measurement positions and in which the sensor 2 does not contact the workpiece W, on the basis of at least either the CAD data or the captured image data. The position determination part 153 generates route information including the coordinates of a plurality of measurement positions in the determined route and the coordinates of a plurality of positions other than the plurality of measurement positions, and notifies the moving control part 152 of the route information.

The position determination part 153 may determine a route on the basis of at least either the design data or the captured image data of the workpiece W, and data indicating the geometry of the measurement apparatus S. Specifically, the position determination part 153 may further use at least a portion of the design data (e.g., CAD data) of the components such as the robot 1, the sensor 2, the light 3, the camera 4, and the mounting table B that the measurement apparatus S includes when determining the route. Further, the position determination part 153 may determine a plurality of measurement positions, measurement order at the plurality of measurement positions, or moving route of the robot 1 using the CAD data of the workpiece W and the design data of the measurement apparatus S. Having the position determination part 153 use the design data of the measurement apparatus S makes it possible to reduce the probability that the components of the measurement apparatus S collide with the workpiece W.

It should be noted that the measurement apparatus S may be able to confirm the quality of the route determined by the position determination part 153 by computer simulation prior to starting measurement. On the basis of the design data of the workpiece W and the measurement apparatus S, the main control part 151 simulates the relation between the positions of each part of the measurement apparatus S and the position of the workpiece W when the robot 1 operates so as to move the sensor 2 on the basis of the route determined by the position determination part 153, and confirms the quality of the route by determining a possibility of a collision between the measurement apparatus S and the workpiece W, for example. When it is determined that a collision between the measurement apparatus S and the workpiece W does not occur, the main control part 151 causes the measurement control apparatus 154 to start measurement. When it is determined that a collision between the measurement apparatus S and the workpiece W may occur, the main control part 151 may cause the position determination part 153 to search for another route without causing the measurement control apparatus 154 to start measurement.

The main control part 151 transmits information indicating a route determined by the position determination part 153 to an external computer, and the external computer may obtain a result of a possibility of the collision between the workpiece W and the measurement apparatus S, which is determined on the basis of the design data of the workpiece W and the measurement apparatus S. The main control part 151 causes the measurement control part 154 to start measurement when obtaining the determination result that there is no possibility of a collision between the measurement apparatus S and the workpiece W. When the determination result that there is a possibility of the collision between the measurement apparatus S and the workpiece W is obtained, the main control part 151 may cause the position determination part 153 to search for another route without causing the measurement control part 154 to start measurement.

The position determination part 153 identifies the position of an edge included in the workpiece W on the basis of at least either the CAD data or the captured image data, and may determine a plurality of measurement positions on the basis of the identified position of the edge. The position determination part 153 makes a plurality of positions included in a plurality of detected edges into a plurality of measurement positions, and makes a plurality of positions in a region surrounded by the edges into a region including a plurality of measurement positions, for example.

The position determination part 153 may determine a plurality of positions to be measured on the basis of a type of measurement performable by the sensor 2 and the position of the edge. In a case where the sensor 2 can measure the distance between a plurality of positions, the position determination part 153 determines a plurality of positions included in a plurality of edges as a plurality of measurement positions so that the sensor 2 can measure the distance between the plurality of edges, for example. In a case where the sensor 2 can measure the distance to the surface of the workpiece W, the position determination part 153 determines a plurality of positions included in a region surrounded by the edges as a plurality of measurement positions so that the sensor 2 can measure the uneven geometry of a region surrounded by the edges.

By controlling the sensor 2 on the basis of the control information inputted from the main control part 151, the measurement control part 154 is synchronized with an operation of the robot 1 to move the sensor 2, and causes the sensor 2 to execute a measurement operation at a measurement position along the normal direction of a position to be measured. Then, the measurement control part 154 outputs measured data indicating a result measured by the sensor 2 at each of a plurality of measurement positions, in association with a plurality of positions to be measured. The measurement control part 154 causes the display part 12 to display the coordinate data indicating the position to be measured and the measured data at the position to be measured in association with each other, and transmits the data to an external device via the communication part 11, for example.

The measurement control part 154 may cause the light 3 to radiate light at a plurality of radiation positions corresponding to a plurality of positions to be measured. The measurement control part 154 causes the light 3 to radiate the light toward the position to be measured in a case where the illuminance of the surface of the workpiece W, when the sensor 2 performs measurement, is required to be a predetermined illuminance, for example. The measurement control part 154 may determine a condition under which the light 3 radiates the light on the basis of at least either the material or the processing state of the surface of the workpiece W indicated by the CAD data or the captured image data. The condition is the intensity, color, or radiation direction of the light, for example.

In a case where the reflectance of the light at the surface near the position to be measured of the workpiece W is determined to be less than a threshold on the basis of at least either the CAD data or the captured image data, the measurement control part 154 causes the light 3 to radiate the light of a first intensity. On the other hand, in a case where the reflectance of the light at the surface near the position to be measured of the workpiece W is determined to be equal to or greater than a threshold on the basis of at least either the CAD data or the captured image data, the measurement control part 154 causes the light 3 to radiate the light of a second intensity smaller than the first intensity. By changing the intensity of the light that the light 3 radiates depending on the state of the surface at each of a plurality of positions to be measured, the measurement control part 154 may keep illuminance at the plurality of positions to be measured constant. Since the measurement control part 154 controls the intensity of the light that the light 3 radiates in such a manner as to allow the sensor 2 to measure the workpiece W at the same measurement conditions regardless of the position to be measured, measurement accuracy is improved.

The measurement control part 154 may control the light that the light 3 emits on the basis of the color of a position to be measured of the workpiece W such that the color of the position to be measured when photographed by an imaging device (i.e., the color when visually recognized) is in a certain range. The measurement control part 154 may control a direction in which the light 3 radiates the light such that the recognized color of a region in the vicinity of a position to be measured is in a certain range.

Process Flow in Control Apparatus 10

Figure 7:
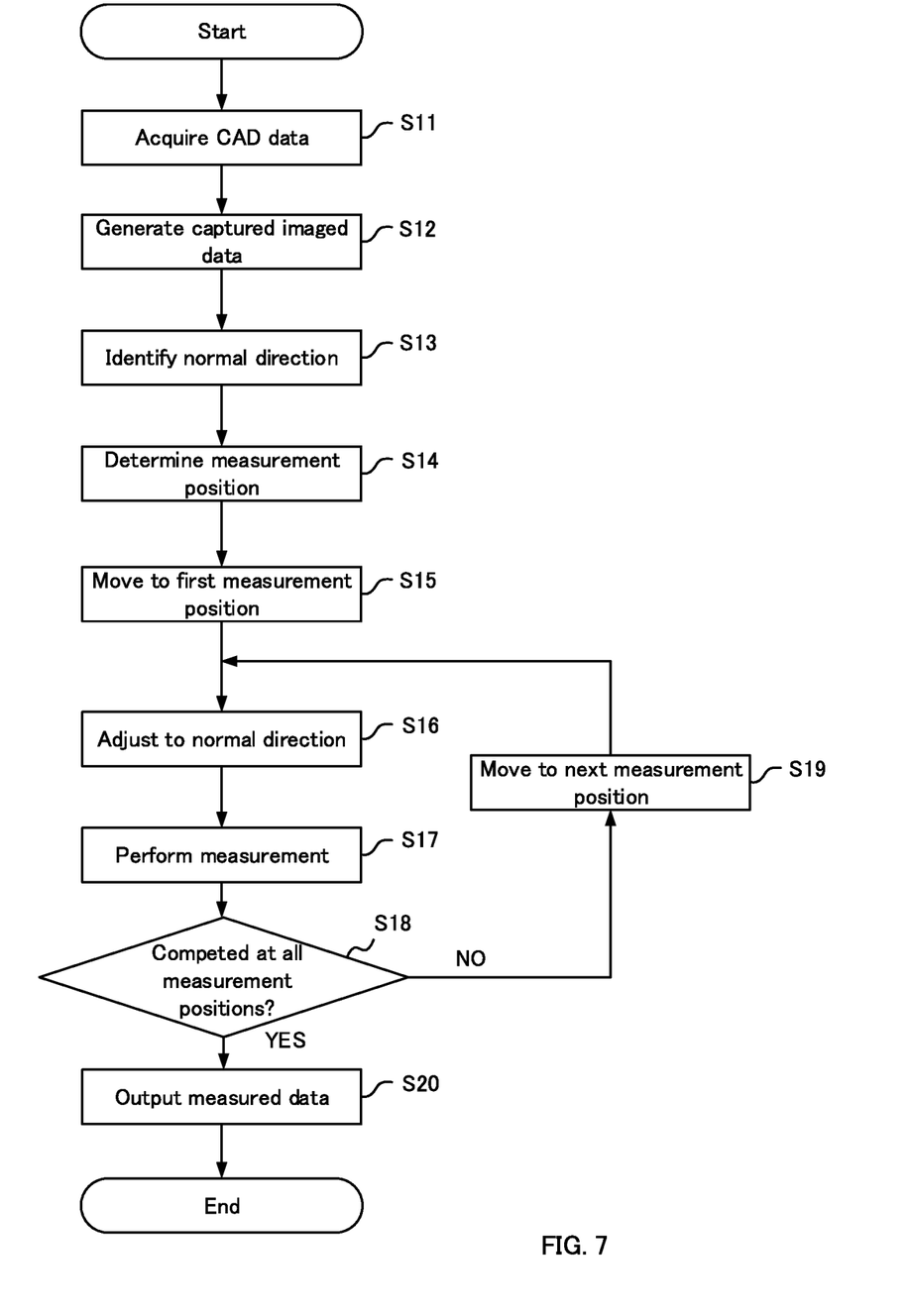
FIG. 7 is a flowchart showing a process flow in the control apparatus.

FIG. 7 is a flowchart showing a process flow in the control apparatus 10. The flowchart shown in FIG. 7 starts from the point when the control apparatus 10 acquires an instruction to start measuring the workpiece W.

The main control part 151 acquires the CAD data from an external computer that stores the design data (S11). Next, the main control part 151 causes the moving control part 152 to control the robot 1 and causes the position determination part 153 to control the camera 4, thereby causing the camera 4 to generate a plurality of pieces of captured image data (S12). Subsequently, by using at least either the CAD data or a plurality of pieces of captured image data, the position determination part 153 identifies the normal direction at each of a plurality of positions to be measured (S13), and determines a plurality of measurement positions and the direction of the sensor 2 on the basis of the normal directions (S14).

Next, to perform measurement with the sensor 2, the main control part 151 instructs the moving control part 152 to move the robot 1 to a plurality of measurement positions, and instructs the measurement control part 154 to start measurement. The moving control part 152 moves the sensor 2 to the first measurement position on the basis of route information inputted from the position determination part 153 (S15). Also, the moving control part 152 adjusts the actuator of the robot 1 at the first measurement position such that the direction of the sensor 2 is the direction of the normal at the position to be measured (S16). Next, the measurement control part 154 causes the sensor 2 to perform measurement at the first measurement position (S17). The measurement control part 154 notifies the main control part 151 that the measurement has been performed.

Upon receiving a notification that the measurement has been performed from the measurement control part 154, the main control part 151 determines whether or not the measurement at all the measurement positions has been completed (S18). When it is determined that the measurement at all the measurement positions has not been completed (NO in S18), the main control part 151 instructs the moving control part 152 to move the sensor 2 to the next measurement position (S19). After moving the sensor 2 to the indicated measurement position, the moving control part 152 adjusts the direction of the sensor 2 to be the direction of the normal at the measurement position after the movement (S16), and the measurement control part 154 causes the sensor 2 to perform measurement (S17). The control apparatus 10 repeats the process from S16 to S19 until the measurement at all the measurement positions is completed.

When the measurement at all the measurement positions is completed (YES in S18), the main control part 151 outputs measured data (S20). The main control part 151 displays the measured data on the display part 12, and transmits the measured data to an external device via the communication part 11, for example.

VARIATION EXAMPLE 1

Figure 8:
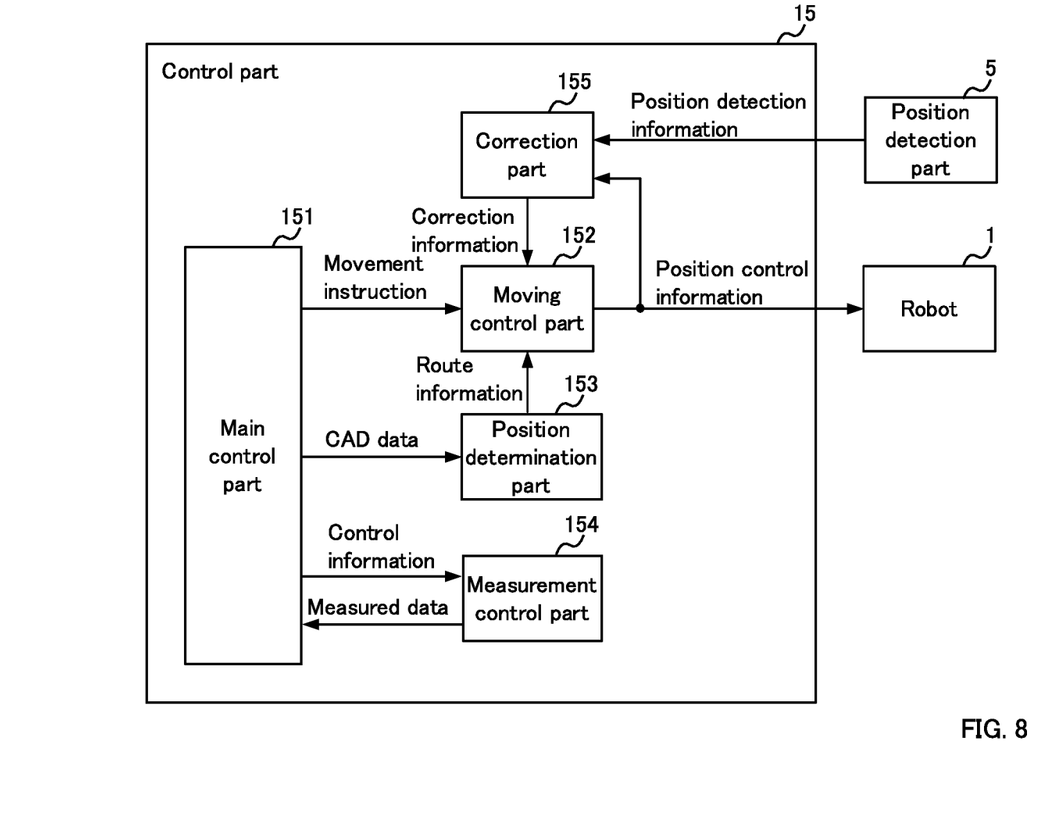
FIG. 8 shows a portion of a configuration of the control apparatus according to a variation example.

To cause the robot 1 to move the sensor 2, the light 3, or the camera 4, the moving control part 152 transmits position control information including, as an instruction value, coordinate data indicating an imaging position or a measurement position to the robot 1. It is assumed that the position of the sensor 2, the light 3, or the camera 4 after being moved by the robot 1 on the basis of the instruction value does not correspond with a position indicated by the instruction value due to various errors. The control apparatus 10 may further include a position detection part 5 and a correction part 155 to deal with such problems.

FIG. 8 shows a portion of the configuration of the control apparatus 10 according to a variation example. The position detection part 5 includes a device for detecting the position of the sensor 2, the light 3, or the camera 4. An example of the device is a camera fixed in a position allowing photographing of the workpiece W in the movable range of the robot 1. The correction part 155 notifies the moving control part 152 of correction information for correcting the instruction value on the basis of the positions of at least one of the sensor 2, the light 3, and the camera 4 detected by the position detection part 5.

Specifically, the correction part 155 calculates a correction value for correcting the instruction value on the basis of the relation between i) a position indicated by the instruction value for moving the sensor 2 to a plurality of measurement positions, which is notified to the robot 1 by the moving control part 152, and ii) the position of the sensor 2 detected by the position detection part 5. The correction part 155 identifies the instruction value by obtaining the position control information outputted to the robot 1 by the moving control part 152, for example. The correction part 155 calculates a difference value, as a correction value, between coordinates indicated by the identified instruction value and the coordinates of the position of the sensor 2 indicated by position detection information inputted from the position detection part 5.

The correction part 155 notifies the moving control part 152 of the calculated correction value. Then, the moving control part 152 causes the robot 1 to move using a value generated by correcting the instruction value with a correction value determined on the basis of the route information. Since the control apparatus 10 includes the position detection part 5 and the correction part 155, the accuracy of the measurement position can be improved.

SECOND VARIATION EXAMPLE

In the above explanation, a case where the moving control part 152 determines a plurality of measurement positions on the basis of a plurality of pieces of captured image data after the camera 4 has generated a plurality of pieces of captured image data, and the measurement control part 154 causes the sensor 2 to perform measurement at a plurality of measurement positions has been exemplified. The order of photographing by the camera 4 and the measurement by the sensor 2 is not limited to this, and may be another order. For example, after the camera 4 has generated first captured image data at a first imaging position corresponding to one first position to be measured, the sensor 2 performs measurement at the first measurement position corresponding to the first position to be measured. Then, after the camera 4 has generated second captured image data at a second imaging position corresponding to the next second position to be measured, the sensor 2 performs measurement at the second measurement position corresponding to the second position to be measured.

THIRD VARIATION EXAMPLE

In the above description, a case where the measurement apparatus S moves the sensor 2, the light 3, and the camera 4 using a single robot 1 has been exemplified, but the measurement apparatus S may move the sensor 2, the light 3, and the camera 4 using a plurality of robots 1. The camera 4 may image the workpiece W to generate captured image data by moving the camera 4 using a first robot 1 with the moving control part 152, and the sensor 2 may measure the workpiece W by moving the sensor 2 using a second robot 1 with the moving control part 152, for example. By having the measurement apparatus S use a plurality of robots 1, it is possible to shorten measurement time since the sensor 2 can perform measurement while the camera 4 is photographing the workpiece W.

FOURTH VARIATION EXAMPLE

In the above description, a case where the sensor 2 and the light 3 are formed integrally has been exemplified, but the structure of the sensor 2 and the light 3 is arbitrary. The light 3 is mounted on the robot 1 so that the direction in which light is radiated can be changed, and the measurement control part 154 may change the direction of the light 3 on the basis of the geometry of the workpiece W at a position to be measured corresponding to a position where the sensor 2 performs measurement, for example. The measurement control part 154 operates in this manner, allowing the light 3 to radiate light from an optimum direction depending on the geometry of the workpiece W, thus improving measurement accuracy.

Effect by Measurement Apparatus S

As described above, the measurement apparatus S includes a multi-axis robot 1 that moves the sensor 2 in a three-dimensional space, and the control apparatus 10 includes the position determination part 153 that determines i) a plurality of measurement positions, which are positions along normal directions at each of a plurality of positions to be measured of the workpiece W, and ii) measurement directions (i.e., the direction of the sensor 2) at each of a plurality of measurement positions on the basis of at least either the CAD data or the captured image data.

Since the position determination part 153 determines a plurality of measurement positions and measurement directions at each of the plurality of measurement positions on the basis of at least either the CAD data or the captured image data, the measurement apparatus S can perform measurement without teaching a measurement position and a measurement direction, or with a reduced amount of teaching compared to a conventional measurement apparatus. Therefore, the measurement apparatus S can reduce measurement time compared to the conventional measurement apparatus. Further, since the measurement apparatus S moves the sensor 2 using the multi-axis robot 1, the sensor 2 can measure the workpiece W from a normal direction at a position to be measured, at a freely selected measurement position in the three-dimensional space, regardless of the geometry of the workpiece W or a position where the workpiece W is placed on the mounting table B. As a result, the measurement apparatus S can improve measurement accuracy.

The present invention is explained on the basis of the exemplary embodiments. The technical scope of the present invention is not limited to the scope explained in the above embodiments and it is possible to make various changes and modifications within the scope of the invention. For example, in the above description, a case of the measurement without teaching has been exemplified, but by specifying a part of a route (e.g., a measurement start position and an end position) in teaching, photographing by the camera 4 may be started, and the measurement by the sensor 2 may be started from the specified position. All or part of the apparatus can be configured to be functionally or physically distributed and integrated in any unit. Further, new exemplary embodiments generated by arbitrary combinations of them are included in the exemplary embodiments of the present invention. The effect of the new embodiment caused by the combination has the effect of the original embodiment together.

What is claimed is:

1. A measurement apparatus comprising:
   a sensor, including any one of an interferometer sensor, a laser range finder, or a confocal chromatic sensor, that measures a workpiece;
   an imaging device that generates captured image data by capturing the workpiece;
   a multi-axis robot that moves the sensor and the imaging device in a three-dimensional space; and
   a controller, including at least a processor, configured to:
   determine a plurality of measurement positions that are positions along a normal direction at each of a plurality of positions to be measured of the workpiece and a direction of the sensor at each of the plurality of measurement positions on the basis of at least captured image data indicating the geometry of the workpiece,
   sequentially move the sensor to the plurality of measurement positions by controlling the robot, and
   output measured data indicating a result that is measured by the sensor at each of the plurality of measurement positions in association with the plurality of positions to be measured,
   repeat moving the imaging device to one imaging position among a plurality of imaging positions where one position to be measured corresponding to one measurement position among the plurality of positions to be measured can be captured by controlling the multi-axis robot before moving the sensor to the one measurement position,
   determine a position of the sensor relative to the workpiece such that the direction of the optical axis of the sensor matches normal directions of the plurality of positions to be measured by identifying the normal directions at the plurality of positions to be measured corresponding to the plurality of imaging positions on the basis of a plurality pieces of captured image data generated by the imaging device at the plurality of imaging positions, and
   control actuators of the multi-axis robot so that the direction of the sensor becomes the determined direction at each of the plurality of positions to be measured.

2. The measurement apparatus according to claim 1, wherein
   the controller is further configured to identify a provisional normal direction at each of the plurality of positions to be measured on the basis of design data, and identify the normal direction by correcting the provisional normal direction on the basis of the state of the workpiece identified on the basis of the captured image data.

3. The measurement apparatus according to claim 1, wherein
   the controller is further configured to:
   on the basis of first captured image data generated by the imaging device at a first imaging position of the plurality of imaging positions, determine the measurement position corresponding to the first imaging position by identifying the normal direction at the position to be measured corresponding to the first imaging position, and
   on the basis of second imaging data generated by the imaging device at a second imaging position, which is separated from the first imaging position by a length determined in a direction of moving the sensor on the basis of a range measurable by the sensor, determine the measurement position corresponding to the second imaging position by identifying the normal direction at the position to be measured corresponding to the second imaging position.

4. The measurement apparatus according to claim 1, wherein
   the controller is further configured to include the plurality of measurement positions and determine a route where the sensor does not contact the workpiece, on the basis of (i) at least the captured image data, and (ii) data indicating the geometry of the measurement apparatus.

5. The measurement apparatus according to claim 1, wherein
   the controller is further configured to determine the plurality of measurement positions such that a distance between the position to be measured identified on the basis of at least the captured image data and the measurement position corresponding to the position to be measured is a focal distance of the sensor.

6. The measurement apparatus according to claim 1, wherein
   the controller is further configured to identify a position of an edge at which the state of the workpiece changes on the basis of at least the captured image data, and determine the plurality of measurement positions on the basis of the identified position of the edge.

7. The measurement apparatus according to claim 1, wherein
the controller is further configured to move the sensor to the plurality of measurement positions by notifying the robot of an instruction value that is determined on the basis of a direction in which the sensor is moved sequentially to the plurality of measurement positions.

8. The measurement apparatus according to claim 1, further comprising an illumination device that radiates light to the workpiece, wherein
the controller is further configured to cause the illumination device to radiate light at a plurality of radiation positions corresponding to the plurality of positions to be measured.

9. The measurement apparatus according to claim 8, wherein
the controller is further configured to determine a condition under which the illumination device radiates light on the basis of at least either a material or a processing state of the surface of the workpiece indicated by design data or the captured image data.

10. The measurement apparatus according to claim 8, wherein
the illumination device is coupled to the sensor, and has an aperture that passes light that the sensor radiates and light reflected from the workpiece.

11. The measurement apparatus according to claim 10, wherein
the illumination device radiates light in a direction in which the sensor emits light for measurement.

12. The measurement apparatus according to claim 8, wherein
the controller is further configured to, when determining that the reflectance of light that the illumination device radiates at the surface near the position to be measured on the workpiece is less than a threshold on the basis of at least the captured image data, cause the illumination device to radiate light of a first intensity, and when determining that the reflectance of light that the illumination device radiates at the surface near the position to be measured on the workpiece is equal to or greater than a threshold, cause the illumination device to radiate light of a second intensity smaller than the first intensity.

13. The measurement apparatus according to claim 8, wherein
the controller is further configured to control light that the illumination device emits on the basis of the color of the position to be measured on the workpiece such that the color of the position to be measured when photographed by the imaging device is in a certain range.

14. The measurement apparatus according to claim 1, wherein
the measurement apparatus includes a first robot and a second robot, wherein
by moving an imaging device that generates the captured image data using the first robot with the controller, the imaging device generates the captured image data by photographing the workpiece, and the sensor performs measurement at the plurality of measurement positions by moving the sensor using the second robot with the controller.

15. The measurement apparatus according to claim 1, wherein the controller is further configured to:
detect a position of the sensor;
determine a correction value for correcting an instruction value, on the basis of the relation between i) the instruction value that is notified to the robot for moving the sensor to the plurality of measurement positions and ii) a position of the sensor detected and
move the robot using a value generated by correcting the instruction value on the basis of the correction value.

* * * * *